United States Patent [19]

Harrington

[11] Patent Number: 5,347,369
[45] Date of Patent: Sep. 13, 1994

[54] PRINTER CALIBRATION USING A TONE REPRODUCTION CURVE AND REQUIRING NO MEASURING EQUIPMENT

[75] Inventor: Steven J. Harrington, Holley, N.Y.

[73] Assignee: Xerox Corporation, Stamford, Conn.

[21] Appl. No.: 35,082

[22] Filed: Mar. 22, 1993

[51] Int. Cl.$^5$ .................. H04N 1/40; H04N 1/23; H04N 1/46

[52] U.S. Cl. .................... 358/401; 358/406; 358/455; 358/501; 358/504; 358/521; 364/526

[58] Field of Search ............... 358/406, 455, 401, 504, 358/521, 501, 296, 300, 298, 456, 458, 520, 518; 355/203, 208; 364/526, 552; 395/109

[56] References Cited

U.S. PATENT DOCUMENTS

| | | | |
|---|---|---|---|
| 3,489,849 | 1/1970 | Hedger | 358/406 |
| 4,075,662 | 2/1978 | Gall | 358/406 |
| 4,422,098 | 12/1983 | Logie et al. | 358/406 |
| 4,751,377 | 6/1988 | Ishizaka et al. | 358/406 |
| 4,941,057 | 7/1990 | Lehmbeck et al. | 358/455 |
| 5,165,074 | 11/1992 | Melino | 358/406 |

Primary Examiner—Scott A. Rogers
Attorney, Agent, or Firm—Oliff & Berridge

[57] ABSTRACT

A method for calibrating a printer determines a tone reproduction curve for the printer. A plurality of bands of different accurate gray level standards and a corresponding number of smoothly increasing sequences of gray level specifications for the printer are printed adjacent to one another. Adjacent bands and sequences are compared, and a point along each band where the band appears equal to the adjacent gray level specification sequence is determined. The points are interpolated and the interpolated values are used to form a tone reproduction curve for the printer. The tone reproduction curve, representing the correspondence between the gray level specification of the printer and the actual gray levels produced by the printer, can then be used to calibrate the printer. The calibrating method can also be used for color printers.

20 Claims, 2 Drawing Sheets

PRINTER CALIBRATION USING A TONE REPRODUCTION CURVE AND REQUIRING NO MEASURING EQUIPMENT

BACKGROUND OF THE INVENTION

1. Field of the Invention

The present invention relates to calibration of a printer and, more particularly, to calibration of a printer using a tone reproduction curve, the calibration requiring no measuring equipment.

2. Description of the Related Art

Electronic printers are generally capable of producing gray tones, as well as standard black and white tones in order to produce gray tones. The printers accept gray level specifications as input and produce corresponding gray areas on a printed page. This production of the corresponding gray areas is often performed by a halftoning operation wherein a fine pattern of black and white dots is printed, the dots appearing as varying gray tones in accordance with the number of black and white dots used when viewed from a distance. The allowed gray level specifications generally vary over some finite range such as 0 to 1 or 0 to 255. The colors at the extremes (i.e., 0 and 1 or 0 and 255) are white and black, numbers between the extremes yielding intermediate gray tones. However, while the gray level specifications may vary linearly, a linear change in gray levels typically does not result. Instead, there may be a particular threshold before lighter toned grays become visible. Similarly, darker toned grays may prematurely appear black.

In order to accurately produce a desired gray level, one must know the correspondence between the gray level specification of the printer and the actual gray level produced by the printer. A tone reproduction curve (TRC) provides an illustration of the corresponding relationship. If the TRC is known, one can compensate for the nonlinearities of the printer.

The TRC, which is dependent upon the stability of the printing device, may change frequently, or the halftone used to produce gray levels may be altered. Thus, to accurately assess the corresponding relationship, the TRC must be measured frequently.

In order to determine the TRC, a sample set of gray level specifications can be printed and the gray levels actually produced by the device can be measured by a device such as a densitometer. The measured points can then be fitted to a curve, this curve being the TRC.

This method of determining the TRC, however, requires special equipment such as the densitometer to measure the gray level. Further, a skilled operator is desired to accurately assess the results of use of the densitometer. The special equipment and skilled operator are not always available for use with every printer.

Accordingly, it would be advantageous to enable determination of the TRC without requiring the use of special equipment and/or a skilled operator.

U.S. Pat. No. 4,941,057 to Lehmbeck et al. discloses a digital image proofing process. The processing arrangement allows a number of image processing techniques to be tested on a single sample sheet at a single time. A sample segment of the image may be selected for testing, and successively repeated in a sample output for the number of image processing techniques to be tested. The proof pages are printed on the printer, with the output of the proof page demonstrating the system operation with the desired image processing technique. The reference provides no disclosure of calibration of a printer.

U.S. Pat. No. 3,489,849 to Hedger discloses a facsimile test pattern generator. The method consists of a test set for testing the operation of a system adapted to reproduce and to record a facsimile in response to receipt signals. The method of the reference also provides no disclosure of a calibration method for a printer.

SUMMARY OF THE INVENTION

The present invention provides a method for calibrating a printer using a tone reproduction curve for the printer. A plurality of bands of different accurate gray level standards and a corresponding number of smoothly increasing sequences of gray level specifications for the printer are printed adjacent to one another. Adjacent bands and sequences are compared, and a point along each band where the band appears equal to the adjacent gray level specification is determined. The points are graphically depicted and connected to form the tone reproduction curve for the printer. The tone reproduction curve represents the correspondence between the gray level specification of the printer and the actual gray levels produced by the printer. Thus, the tone reproduction curve can then be used to calibrate the printer, the calibration being performed without the use of any special measuring equipment. The calibrating method of the present invention can also be used for color printers.

BRIEF DESCRIPTION OF THE DRAWINGS

The invention will be described with reference to the following figures, wherein.

DETAILED DESCRIPTION OF THE PREFERRED EMBODIMENT

Gray levels can be produced in a variety of manners on a printer. For example, gray levels can be produced by printing a fine pattern of black and white dots (halftoning), printing a coarse pattern of black-and-white checks, printing a coarse pattern of black-and-white stripes, etc.

Printed coarse patterns such as black-and-white stripes and black-and-white checks can be highly visible when viewed from a normal viewing distance and thus be unacceptable for normal printing. However, when viewed from a greater viewing distance, such coarse patterns can yield a very accurate gray level since the coarse patterns avoid small isolated black or white areas and because the coarse patterns have a low perimeter to area ratio.

Thus, if a coarse pattern could be found which accurately produces a desired gray level, then one could compare the grays normally produced by the printer against the accurate coarse pattern gray level standard to find a point on the tone reproduction curve for the printer. This is the theory of the present invention.

Figure 1:
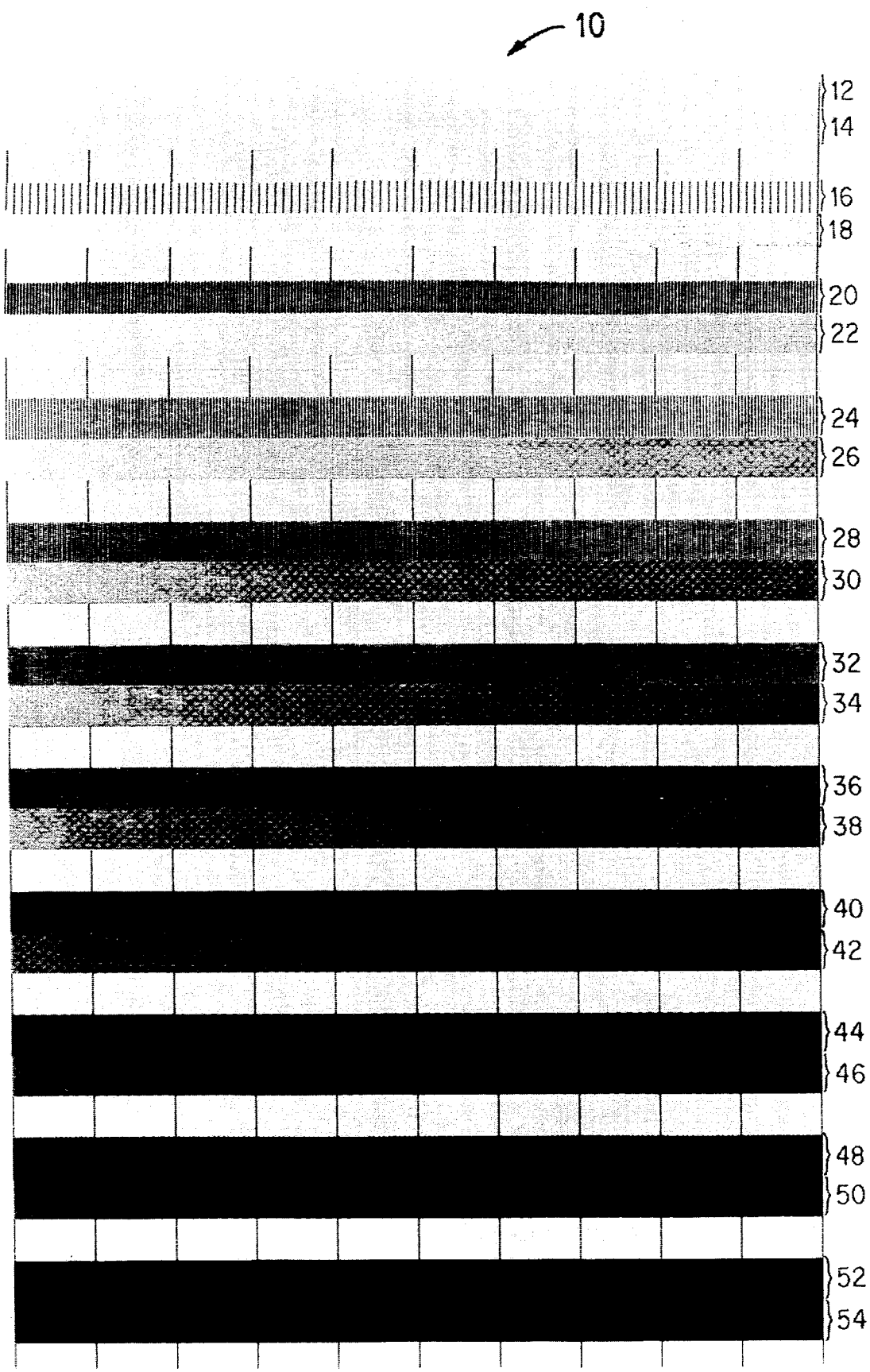
FIG. 1 is a printer test chart which compares halftone sequences of gray level specifications with striped bands of gray level standards.

As illustrated in FIG. 1, such a comparison can be made by printing smoothly increasing sequences 14, 18, 22, 26, 30, 34, 38, 42, 46, 50 and 54 of gray level specifications next to bands 12, 16, 20, 24, 28, 32, 36, 40, 44, 48 and 52 of the coarse pattern gray level standard (e.g., striped standard). The sequences and bands are printed such that one smoothly increasing sequence of the gray level specifications is adjacent to one band of the gray level standards.

When viewing FIG. 1 from a distance, the patterns appear gray in color. The varying gray level in the sequences 14, 18, 22, 26, 30, 34, 38, 42, 46, 50 and 54 appears to progress from lighter than the corresponding standards 12, 16, 20, 24, 28, 32, 36, 40, 44, 48, and 52 to darker than the standards. For each adjacent pair (e.g., pair 24 and 26), a point where the grays appear equal can be determined. Such a determination can be made subjectively (e.g., visually) or objectively. The position of the crossover point provides an indication of which gray level specification on the printer provides the same gray as the coarse pattern standard.

FIG. 1 illustrates the technique of the present invention used for the calibration of the black color separation of a printer. For the particular printer, it was found that vertical stripes of at least two pixels in width produce accurate gray levels. FIG. 1 illustrates the test chart comparing the halftone gray level specifications against striped patterns for 1.0, 0.9, 0.75, 0.67, 0.6, 0.5, 0.4, 0.33, 0.25, 0.1 and 0 gray levels. From the test chart, for each of the gray levels, a point can be determined where the grays for each adjacent pair of gray level specifications and coarse pattern standards appear equal. One can then use well known interpolation techniques to find approximate values for the TRC at gray levels which lie between those measured.

Figure 2:
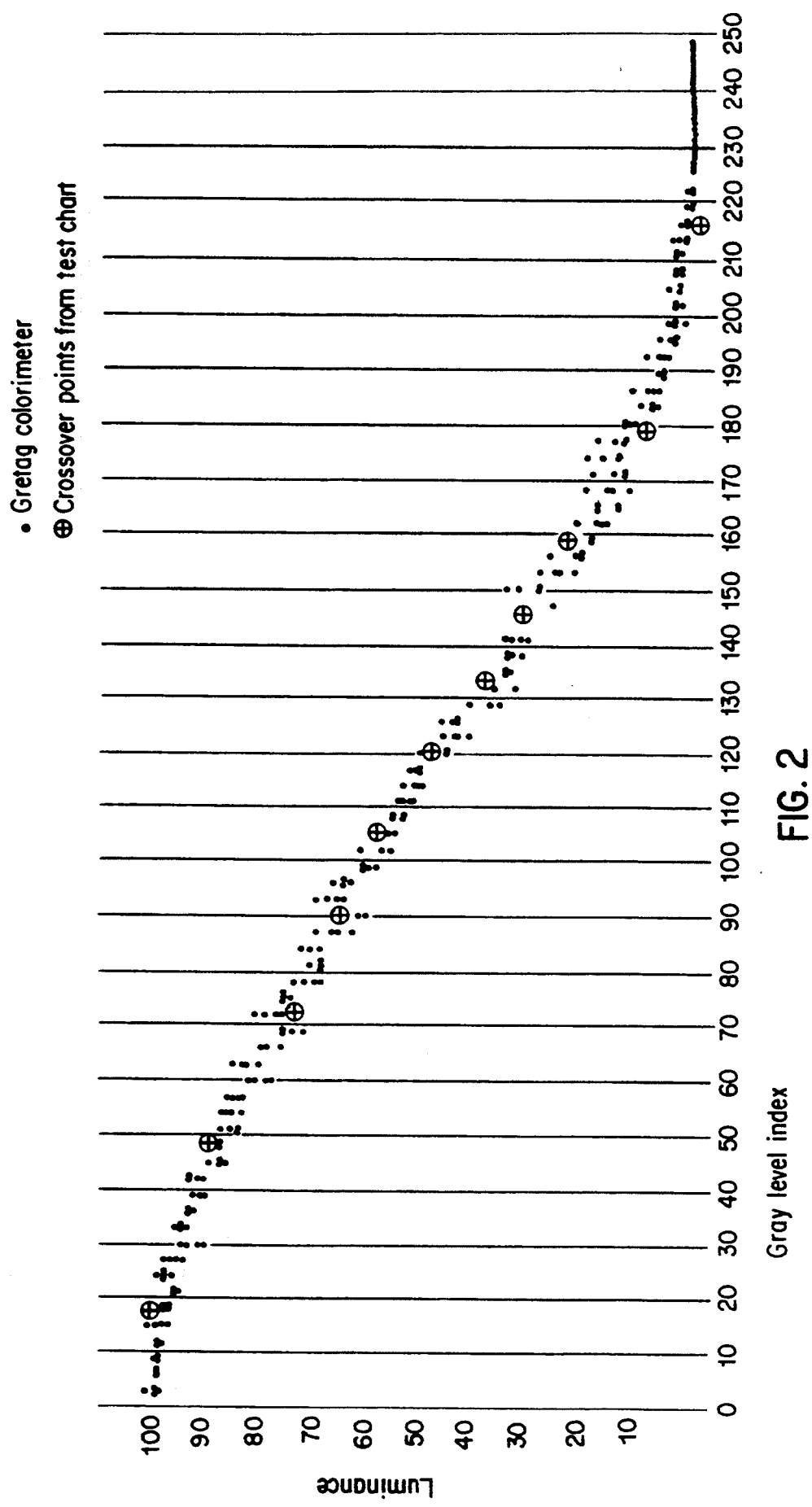
FIG. 2 is a graph of printer luminance as measured by both a colorimeter and by crossover points indicated on the test chart of FIG. 1.

As illustrated in FIG. 2, a graph of the luminance for the printer (i.e., the TRC), the points for each of the gray levels can be graphically depicted. These points are graphically depicted as the encircled points. FIG. 2 also illustrates the luminance for the printer as measured by a Gretag colorimeter. As illustrated in the Figure, the luminance as measured by the crossover points of the present invention very closely approximates the luminance measured by a Gretag colorimeter. Accordingly, the present invention enables determination of the accurate TRC with out requiring the use of any special equipment. Further, by connecting the crossover points, the TRC for the particular printer can be determined.

While the invention discloses adjacent printing of a plurality of bands of gray level standards and a corresponding number of smoothly increasing sequences of gray level specifications, alternative manners of providing the standards and specifications can be performed. For example, templates can be provided of the gray level standards, and the templates can be positioned adjacent to the gray level specifications. Accordingly, the gray level standards would not have to be repeatedly printed.

While this invention has been described in conjunction with a specific embodiment thereof, it is evident that many alternatives, modifications and variations will be apparent to those skilled in the art. For example, although the invention has been discussed with respect to black and gray calibration, the technique of the present invention can also be used to find the TRC's for other color separations. One can, for example, print and compare patterns with cyan ink instead of black ink. The crossover point determined by the present invention would then indicate which cyan level index is needed to produce a particular amount of cyan coverage. Accordingly, the preferred embodiment of the invention as set forth herein is intended to be illustrative, not limiting. Various changes may be made without departing from the spirit and scope of the invention as defined in the following claims.

What is claimed:

1. A method for determining a tone reproduction curve for calibrating a printer comprising:
    providing a plurality of bands of an accurate gray level standard, each band being of a different gray level value;
    printing a corresponding plurality of smoothly increasing sequences of gray level specifications using the printer, each of said corresponding plurality of sequences being adjacent a corresponding one of said plurality of bands and smoothly increasing from a gray level value below that of said corresponding band to a gray level higher than said corresponding band;
    visually comparing each of said plurality of bands of gray level standard with said corresponding one of said sequences of gray level specifications;
    manually determining a point along each said sequence that appears equal to said corresponding band; and
    calibrating the printer using said determined points.

2. The method according to claim 1, wherein said bands of gray level standard comprises a coarse pattern.

3. The method according to claim 2, wherein said coarse pattern comprises stripes.

4. The method according to claim 2, wherein said coarse pattern comprises checks.

5. The method according to claim 1, wherein each of said sequences is printed using halftone printing techniques.

6. The method according to claim 1, including;
    interpolating between each of said points;
    using the interpolated values to form a tone reproduction curve for the printer; and
    using said tone reproduction curve to calibrate said printer.

7. The method of claim 1, wherein said plurality of bands of accurate gray level standards are printed onto a surface using the printer, said bands being formed of vertical black stripes separated by vertical white stripes, the thicknesses of said black stripes and said white stripes determining the gray level value of each of said bands.

8. The method of claim 7, wherein each of said sequences is printed using halftone printing techniques.

9. The method of claim 1, wherein said plurality of bands of accurate gray level standards are printed onto a surface using the printer, said bands being formed of coarse checked patterns of black and white elements, the relative dimensions of said elements determining the gray level value of each of said bands.

10. A method for determining a tone reproduction curve for calibrating a printer comprising:
    providing a plurality of bands of an accurate color standard, each band being of a different luminance value;
    printing a corresponding plurality of smoothly increasing sequences of color specifications using the printer, each of said corresponding plurality of sequences being adjacent a corresponding one of said plurality of bands and smoothly increasing from a luminance value below that of said corresponding band to a luminance value higher than said corresponding band;

visually comparing each of said plurality of bands of color standard with said corresponding one of said sequences of said color specifications;

manually determining a point along each said sequence that appears equal to said corresponding band; and calibrating the printer using said determined points.

11. The method according to claim 10, wherein said band of said color standard comprises a coarse pattern.

12. The method according to claim 11, wherein said coarse pattern comprises stripes.

13. The method according to claim 11, wherein said coarse pattern comprises checks.

14. The method according to claim 10, wherein said sequence of color specifications comprises a varying halftone color specification.

15. A method for determining a tone reproduction curve for calibrating a printer comprising:

providing a plurality of bands of an accurate color standard, each band being of a different luminance value;

printing a corresponding plurality of smoothly increasing sequences of color specifications using the printer, each of said corresponding plurality of sequences being adjacent a corresponding one of said plurality of bands and smoothly increasing from a luminance value below that of said corresponding one band to a luminance value higher than said corresponding one band;

visually comparing each of said plurality of bands of color standard with said corresponding one of said sequences of said color specifications;

manually determining a point along each said sequence that appears equal to said corresponding band;

calibrating the printer using said determined points;

interpolating between said determined points; and using the interpolated values to form a tone reproduction curve.

16. The method according to claim 15, wherein said sequences of color specifications comprise varying halftone color specifications.

17. The method according to claim 15, wherein said bands of said color standard comprise coarse patterns.

18. The method according to claim 17, wherein said coarse patterns comprise stripes.

19. The method according to claim 17, wherein said coarse patterns comprise checks.

20. A method for determining a tone reproduction curve for calibrating a printer comprising:

printing a plurality of bands of an accurate gray level standard using the printer, each band being of a different gray level value;

printing a corresponding plurality of smoothly increasing sequences of gray level specifications using the printer, each of said corresponding plurality of sequences being parallel with and adjacent a corresponding one of said plurality of bands and smoothly increasing from a gray level value below that of said corresponding one band to a gray level value higher than said corresponding one band;

visually comparing each of said plurality of bands of gray level standard with a corresponding one of said sequences of gray level specifications;

determining a point along each said sequence where said sequence appears equal to said corresponding accurate gray level standard;

interpolating between each determined point to derive a tone reproduction curve; and calibrating the printer using said tone reproduction curve.

* * * * *